Dec. 29, 1953  C. JOHNSON  2,664,266
VALVE MECHANISM
Filed Jan. 21, 1948

INVENTOR.
CLARENCE JOHNSON
BY Ralph C. Distin
ATTORNEY

Patented Dec. 29, 1953

2,664,266

UNITED STATES PATENT OFFICE 2,664,266

VALVE MECHANISM

Clarence Johnson, Orfordville, Wis.

Application January 21, 1948, Serial No. 3,617

9 Claims. (Cl. 251—133)

This invention relates to valve mechanisms for controlling the flow of fluids, and more particularly to faucets adapted especially for controlling the flow of liquids.

A faucet ordinarily includes a valve member engageable with a valve seat for cutting off the flow of fluid, and movable manually relative to the seat for regulating the flow of fluid from a supply connection to a point of discharge. Engagement between the valve member and its seat results in time in a wearing of the engaging surfaces to such an extent that it is impossible to cut off the flow of fluid. The valve member is frequently forced against its seat under a pressure much greater than is necessary to stop the flow, and, when the valve member is made of a comparatively soft material, as is usually the case, it is soon cut or forced out of shape so that it no longer obtains full engagement with the seat. The valve member usually has the same points on its surface engaging the seat when in closed position, and wear is therefore concentrated on a comparatively small area.

By arranging a valve member of resilient material for movement into a restricting passage between the points of supply and discharge, it will be seen that the flow of fluid may be cut off when the valve member is forced into such passage. It is not necessary that the restricting passage be a great deal smaller than the valve member to effect a fluid tight engagement of the latter with the walls of the passage. The valve member may be freely received within the passage and be positioned by a manually adjustable abutment member against the action of the fluid from the source of supply. The fluid pressure acting on the valve member to hold it against the adjustable abutment tends to cause it to expand into sealing engagement with the walls of the passage. Movement of the valve member in one direction may effect an opening of passage means for delivering fluid from the supply connection to the point of discharge. By making the valve member in the shape of a sphere, a turning of the valve member into any position may take place without affecting its action in controlling the flow of fluid. Since the valve member has only a sliding engagement with the walls of the passage and is adapted to change its position during operation, practically no wear of the surfaces takes place. It will be appreciated also that when the valve member is used for the control of the flow of liquids, such as water, a lubrication of the surfaces is provided for reducing further any friction tending to wear the surfaces.

An object of my invention is to provide an improved valve mechanism for controlling the flow of fluid. Another object is to provide an improved manually adjustable faucet for regulating the flow of liquid under pressure from a supply connection to a point of discharge. Still another object is to provide a valve mechanism having a free valve member of resilient material adapted to be positioned by the action of fluid and a manually adjustable member in a restricting passage for controlling the flow of the fluid. Other objects will appear in the course of the description.

In the accompanying drawing in which there are shown for purposes of illustration, several forms which my invention may assume in practice:

Figure 1:
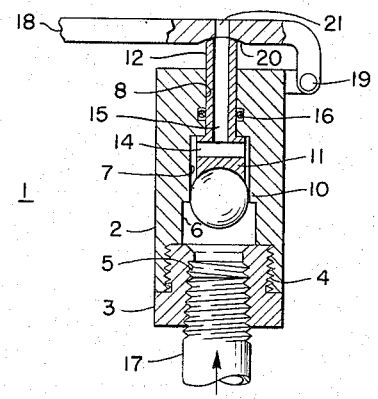
Fig. 1 is a vertical sectional view of one form of my improved valve mechanism or faucet.
Figure 2:
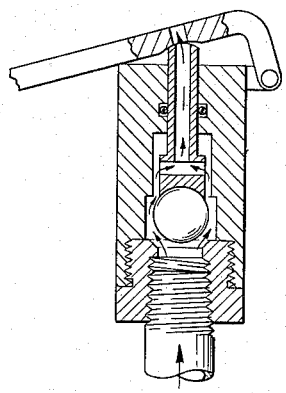
Fig. 2 is a view similar to Fig. 1 but showing parts in different positions.

Referring to the drawing, and more particularly to Figs. 1 and 2, it will be noted that there is shown a valve mechanism, generally designated 1, including a valve block 2 having an opening at one end into which a projecting portion of a cap 3 is threaded, as at 4. Formed in the cap is a threaded opening 5 which communicates with one end of a bore 6 in the block. Extending into the block from the other end of the bore 6 is a reduced bore 7, and extending from the bore 7 through the remainder of the block's length is a further reduced bore 8. Arranged within the bores 6 and 7 is a valve member 10 of resilient material, such as rubber or some composition thereof, having a circular cross section slightly larger in diameter than the bore 7 and somewhat smaller than the bore 6. Received within the bore 7 is an abutment member 11 which is shaped to provide a clearance between its sides and the walls of the bore, and projecting from the abutment member is a stem 12 which extends through the bore 8 in sliding engagement with the walls thereof. A passage 14 extending transversely through the member 11 communicates with a passage 15 extending longitudinally through the stem 12. To prevent the escape of fluid between the stem and the wall of the bore 8, a packing ring 16 is provided as shown. Fluid is supplied under pressure through a conduit 17 to the bore 6, and the fluid acting on the valve member 10 tends to force the latter into the bore 7.

The valve member 10 is shown herein as being of a spherical shape so that it may turn into any position and yet sealingly engage the walls of the bore 7 when forced into the latter. It will be seen that this valve member will be distorted slightly as it is moved into the bore 7, and will engage the walls of the bore around its periphery with an area of contact that prevents the passage of fluid. The action of the fluid on the valve member, and any slight unbalance in the resistance to movement of the valve member will cause it to turn into different positions. During operations of the mechanism, the valve member will change its positions within the bores so that different points on its surface will be subjected to wear. Although a valve member having a spherical shape is preferred, it may have other shapes, for instance one in which there are frusto conical portions extending in opposite directions from a mid portion that is slightly larger in diameter than the bore 7. The distortion of the valve member on movement into the bore 7 is very slight, and the resistance to its movement is so small, especially when the fluid controlled is a liquid such as water, that the wearing of its surfaces is negligible.

The surface on the abutment member 11 next to the valve member may be recessed and shaped to conform to that of the valve member, as shown, or it may be a plane surface or a surface of some other shape. When this surface is shaped to the valve member, there is less distortion of the valve member as it is forced against the surface by the fluid. As the area of contact between the abutment surface and the valve member is decreased, the distortion of the latter to increase its contact with the wall of the bore 7 is increased.

For positioning the abutment member 11 within the bore 7, there is provided a manually operable lever 18 pivotally connected to the valve block at 19 and adapted to engage the outer end of the stem 12. As shown herein, a recess 20 is provided in the lever for receiving the end of the stem and preventing relative transverse movement. An opening 21 in the lever cooperates with the passage 15 so that fluid may be discharged to a point above the lever.

The type of valve mechanism described above is especially adapted for use in drinking fountains. Water supplied through the conduit normally holds the valve member 10 in the bore 7 against the abutment member 11, and the flow of water is prevented. When the lever 18 is pressed downwardly so that the valve member is moved into the bore 6, water then flows around the valve member, past the sides of the abutment member, and through the passages 14 and 15 to the opening 21 where it is discharged.

Figure 3:
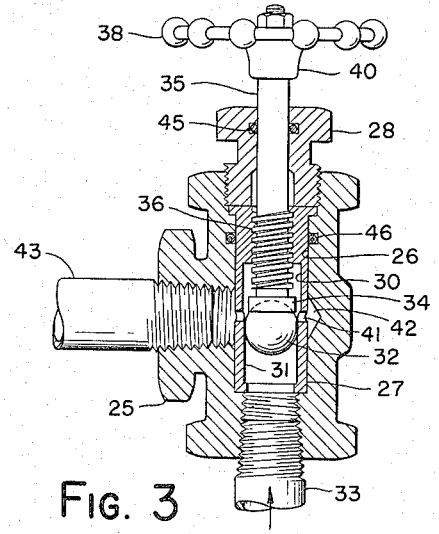
Fig. 3 is a vertical sectional view of another form of my improved valve mechanism or faucet.
Figure 4:
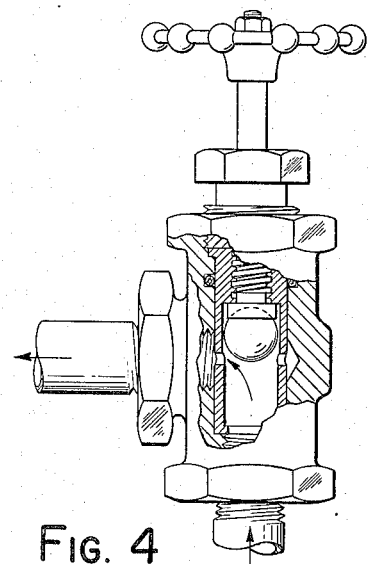
Fig. 4 is a view of a mechanism like that of Fig. 3 but with parts shown in different positions.

Figs. 3 and 4 show another form of my improved valve mechanism including a housing 25 having a bore 26 formed therein for receiving a sleeve shaped member 27 which is held in place by a plug 28 threaded into an opening in one end of the housing. Formed in the member 27 are axial bores 30 and 31 opening into each other with the bore 31 being slightly smaller in diameter than the bore 30. Arranged within the bores is a spherical valve member 32 of resilient material having a loose sliding fit with the bore 30. The valve member may be easily forced into the bore 31 but is slightly deformed at this time to provide an area contact around its periphery sealingly engaging the walls of the bore. A conduit 33 communicates with the lower end of the bore 31 for supplying fluid which acts against the valve member to hold it against an abutment plate 34 carried by a stem 35 extending through openings in the member 27 and the plug 28. The stem is threadedly connected to the member 27 at 36, and a handle 38 on the stem permits the latter to be rotated manually for adjusting the plate 34 longitudinally of the bores 30, 31 to position the valve member. Movement of the valve member into the bore 31 against the flow of fluid is limited herein by engagement of a handle hub portion 40 with the plug 28. Any other suitable motion limiting means may be provided, if desired. It is only desirable that movement of the valve member by the adjustable abutment be limited so that it is not forced against surfaces which obstruct its motion. At the junction of the bores 30, 31 are radial ports 41 in the sleeve member 27 communicating with an annular groove 42 in the housing 25, and a conduit 43 is threaded through an opening in the housing into communication with this groove.

The flow of fluid in this case is stopped by adjusting the abutment plate 34 manually to force the valve member 32 into the bore 31. When the plate is raised by rotation of the stem 35, the fluid forces the valve member through the bore 31 toward the bore 30. As soon as the valve member passes beyond the ports 41, fluid escapes through the latter to the conduit 43. The escape of fluid through the ports 41 results in a drop in pressure against the valve member, but, by reason of the loose fit of the valve member in the bore 30, less pressure is needed to hold it against the plate 34. The pressure is sufficient at all times to hold the valve member against the plate so that every adjustment of the latter results in a positioning of the valve up to the point where the ports 41 are fully opened. To prevent the escape of fluid along the stem 35 and along the outer surface of the member 27, there may be provided suitable packings at 45 and 46. Instead of making the sleeve member 27 in one piece as shown, it may be made in two parts, an upper one in which the bore 30 is formed and a lower one in which the bore 31 is formed. The upper part may then be made integral with the plug 28 so that it may be moved with the latter to adjust the clearance between the adjacent ends of the parts for the escape of fluid.

Figure 5:
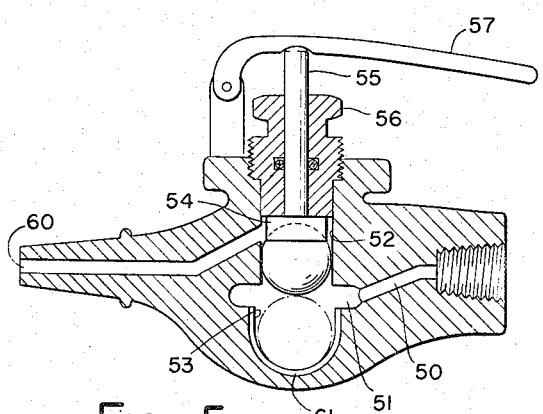
Fig. 5 is a vertical sectional view of still another form of my improved valve mechanism or faucet.

In Fig. 5 there is shown a valve mechanism which operates in a manner similar to that of Figs. 1 and 2 for controlling the flow of fluid. In this case, however, fluid is supplied through a passage 50 to an annular groove 51 at the junction of two bores 52 and 53. A valve member 54 has a fluid tight fit with the bore 52 and a loose sliding fit with the bore 53. An abutment plate 54 has a stem 55 extending through a plug 53 closing the upper end of the bore 52, and a pivoted lever 57 engages the end of the stem for moving the abutment plate downwardly to force the valve member toward the bore 53 against the action of the fluid. As the valve member moves past the annular groove 51, fluid passes from the latter to the bore 52 and escapes through a discharge passage 60. Formed in the wall of the bore 53 are grooves 61 communicating with the groove 51 and leading to the lower end of the bore. Fluid is supplied continuously from the passage 50 through the grooves 51 and 61 to the lower side of the valve member so that it acts to move the latter upwardly when the abutment plate is raised. The fluid pressure acting on the upper side of the valve member when the latter is open is never as great as the pressure at the lower side of the valve, and a raising of the abutment plate results in an immediate closing of the valve.

Figure 6:
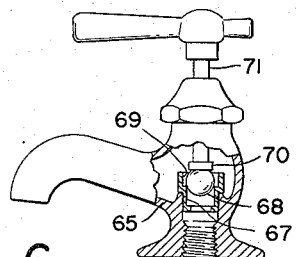
Fig. 6 is a view of a faucet broken away to show my invention incorporated therein in another form.

In Fig. 6 there is shown an ordinary faucet that is altered to incorporate my invention. In this case an opening is bored through the valve seat 65 to receive a member 66 having a bore 67 in which a valve member 68 is adapted to be received for cutting off the flow of fluid. A larger bore 69 in the member 66 communicates with the bore 67, and an abutment plate 70 carried by a manually adjustable stem 71 is adapted to move the valve member into the bore 67 against the action of the fluid pressure. The bore 69 is large enough so that the fluid may pass around the valve member and escape to the passage means at the discharge side of the valve seat.

While there are disclosed in this application several forms which my invention may assume in practice, it will be understood that it may be modified and embodied in various other forms without departing from its spirit or the scope of the appended claims.

What I claim as new, and desire to secure by Letters Patent of the United States, is:

1. A valve mechanism comprising, in combination, a valve block having stepped bores therein opening into each other, a spherical shaped valve member made of a resilient material and having a close sliding engagement with the smaller one of said bores, means for supplying fluid under pressure to the larger one of said bores and against said valve member to urge said valve member toward said smaller bore in all operative conditions of said valve mechanism, an abutment member received within the smaller one of said bores and having a stem projecting through an opening in said block to the exterior thereof, passage means in said abutment member and stem for connecting the smaller one of said bores in communication with the atmosphere, and manually actuatable means engageable with the stem of said abutment member for moving the latter to force said valve member against the action of the fluid supply pressure into the larger of said bores and connect the fluid supply means in communication with said passage means.

2. The valve mechanism of claim 1 in which said manually actuatable means comprises a lever pivotally connected to said valve block and engageable with the end of said valve stem.

3. A valve mechanism comprising, in combination, a valve housing having bores of different diameter formed therein in axial alignment and in communication with each other, fluid supply means communicating with said bores at the junction thereof, a fluid discharge passage communicating with the one of said bores of smaller diameter at a point spaced from the junction of said bores, a spherical shaped valve member of resilient material having a fluid tight sliding fit in the one of said bores commuicating with said discharge passage and movable into the other of said bores, and a manually adjustable abutment member for moving said valve member into said other bore to provide a passage around said valve member for connecting said fluid supply means in communication with the end of said other bore opposite from the junction of said bores.

4. A valve mechanism comprising, in combination, a valve casing, an insert in said casing having a pair of stepped cylindrical bores in axial alinement and in communication with each other, a spherical shaped valve member of resilient material loosely received in the larger one of said bores and having a close fit with and movable along the length of the smaller one of said bores, passage means communicating with the smaller one of said bores at a point spaced from the junction of said bores and adapted to supply fluid thereto at a pressure sufficient to move said valve member through said smaller one of said bores, a fluid discharge port communicating with each of said bores at the junction thereof, and a manually adjustable abutment member selectively positionable in said bores and engageable with said valve member for arresting movement of said valve member at any point along the smaller one of said bores against the action of the fluid supplied whereby the fluid pressure will deform the valve member into fluid tight sealing engagement with the walls of the smaller one of said bores to cut off the fluid flow from said supply passage means to said discharge port.

5. The valve mechanism of claim 4 in which said manually adjustable abutment member has a threaded connection with said insert.

6. In a fluid valve mechanism, a valve block having passage means therein comprising a pair of aligned, axially extending bores of respectively different uniform cross-sectional area from end to end, fluid supply and discharge passages communicating with said passage means at points spaced longitudinally thereof and respectively communicating with one only of said aligned bores, a deformable valve member having an undeformed maximum dimension only slightly less than the dimension of said smaller of said aligned bores whereby said valve member is freely movable along said passage means between said points of communication under influence of said fluid passing through said valve, and a manually adjustable abutment member movable throughout substantially the entire length of said passage means to a position to selectively arrest movement of said valve member in said bore of smaller cross-sectional area at a point between said supply and discharge passages wherein it will be subjected to pressure of the fluid, deformed into fluid tight sealing engagement with said bore of said passage means, and disrupt fluid flow from said supply passage to said discharge passage.

7. In a valve mechanism, a valve block having cylindrical passage means therein, fluid supply and discharge passages communicating with said passage means at points spaced longitudinally thereof, a deformable spherical shaped valve member having an undeformed diameter only slightly less than the cross-sectional area of said passage means whereby said valve member, when uncompressed, will be freely movable throughout the length of said passage means, and a manually adjustable abutment member selectively positionable in said passage means to hold valve member against the fluid pressure in said supply passage at any selected position in said passage means between said supply and discharge passages where said fluid pressure will act on and deform said valve member into fluid tight sealing engagement with the cylindrical walls of said passage means to cut off the fluid flow between said supply passage and said discharge passage.

8. In a valve mechanism, a valve casing having a pair of stepped cylindrical bores in axial alignment and in communication with each other, fluid supply and discharge passages respectively communicating with said bores at points spaced longitudinally thereof, a manually adjustable abutment member selectively positionable in said bores, a deformable valve member having an undeformed maximum dimension only slightly less than the diameter of the smaller of said bores and normally abutting said abutment member under influence of the pressure in said fluid supply passage and positioned therewith, said valve member having a loose fit in the larger of said bores and a close fit in the smaller of said bores so that when said valve member is positioned at any point in the smaller of said bores the fluid pressure in said fluid supply passage deforms said valve member into fluid tight sealing engagement with the walls of said smaller bore to cut off the fluid flow from said supply passage to said discharge passage.

9. The valve mechanism of claim 8 in which external means are provided for limiting the movement of said abutment member along the smaller of said bores to arrest said valve member in the smaller of said bores between said supply and discharge passage.

CLARENCE JOHNSON.

References Cited in the file of this patent

UNITED STATES PATENTS

| Number | Name | Date |
|---|---|---|
| 179,263 | Carlton | June 27, 1876 |
| 634,547 | Van Auken | Oct. 10, 1899 |
| 1,642,724 | Fleming | Sept. 20, 1927 |

FOREIGN PATENTS

| Number | Country | Date |
|---|---|---|
| 13,043 | Great Britain | 1904 |